May 14, 1957  A. H. HARWELL  2,791,840
LOCK DE-CODER AND METHOD OF LOCK DE-CODING
Filed Jan. 9, 1955  8 Sheets-Sheet 1

Arthur H. Harwell
INVENTOR.

BY Geo. C. Helmig
 Wm. E. Ford
ATTORNEYS

May 14, 1957 A. H. HARWELL 2,791,840
LOCK DE-CODER AND METHOD OF LOCK DE-CODING
Filed Jan. 9, 1955 8 Sheets-Sheet 2

Arthur H. Harwell
INVENTOR.

BY Geo. C. Helmig
+ Wm. E. Ford
ATTORNEYS

May 14, 1957   A. H. HARWELL   2,791,840
LOCK DE-CODER AND METHOD OF LOCK DE-CODING
Filed Jan. 9, 1955   8 Sheets-Sheet 3

Arthur H. Harwell
INVENTOR.

BY Geo. C. Helmig
+ Wm. E. Ford
ATTORNEYS

May 14, 1957  A. H. HARWELL  2,791,840
LOCK DE-CODER AND METHOD OF LOCK DE-CODING
Filed Jan. 9, 1955  8 Sheets-Sheet 4

Arthur H. Harwell
INVENTOR.

BY Geo. C. Helmig
 Wm. E. Ford
ATTORNEYS

May 14, 1957 A. H. HARWELL 2,791,840
LOCK DE-CODER AND METHOD OF LOCK DE-CODING
Filed Jan. 9, 1955 8 Sheets-Sheet 6

Arthur H. Harwell
INVENTOR.

BY Geo. C. Helmig
+ Wm. E. Ford
ATTORNEYS

May 14, 1957     A. H. HARWELL     2,791,840
LOCK DE-CODER AND METHOD OF LOCK DE-CODING
Filed Jan. 9, 1955     8 Sheets-Sheet 8

Arthur H. Harwell
INVENTOR.

BY Wm. E. Ford

ATTORNEY

United States Patent Office 2,791,840
Patented May 14, 1957

2,791,840

LOCK DE-CODER AND METHOD OF LOCK DE-CODING

Arthur H. Harwell, Houston, Tex.

Application June 9, 1955, Serial No. 514,180

24 Claims. (Cl. 33—174)

This invention relates to a lock de-coder and method of lock de-coding and key construction which will enable a locksmith to rapidly and accurately de-code the widest variety of locks on location, as of the tumbler type, and construct keys, therefor without necessarily using a key cutting machine, and without requiring the disassembly of the lock. This application showing such invention is a continuation in part of my co-pending application Serial No. 316,976, filed October 27, 1952, for Lock Decoder, and of my co-pending application Serial No. 378,211, filed September 3, 1953, for Lock Decoder and Method of Lock De-Coding and Key Construction.

It is an object of this invention to provide a lock decoder and method of lock de-coding by which the widest variety of locks may be quickly de-coded at any location, and a key made at such location if desired, and in the absence of a key cutting machine.

It is a further object of this invention to provide a lock-decoder and method of lock de-coding of this class having means to multiply individual reading on a disc included as part of the frame so that skillful and accurate reading may be obtained for each de-coded station.

It is still another object of this invention to provide a lock de-coder and method of lock de-coding having a frame with reading multiplier thereon so constructed for interchangeability of parts as to accommodate a wide variety of interchangeable guides, caliper members, and spacers, and also adapted to permit rapid shifting of spacers from station to station.

It is still a further object of this invention to provide a lock de-coder and method of lock decoding in which the spacers employed are provided wih interchangeable parts adapting them to space the caliper members to decode a multiplicity of locks with varying station pitches.

It is a further and primary object of this invention to provide a lock decoder of this class having a probe extending for a substantial length in a plane operable at a slight angle to the lock cylinder axis so as to insure tumbler contact at points insuring minimum inaccuracy of readings.

Other and further objects will be apparent when the specification is considered in connection with the drawings in which.

Of the views shown, Figs. 1–25 are photostatic copies of the identical disclosures shown in co-pending application Serial No. 378,211, filed September 3, 1953, for Lock De-Coder and Method of Lock Decoding and Key Construction with the single exception of the configuration of the finder probe 43' to be described hereinbelow.

In Figs. 1, 6, 7, and 8, a pin tumbler lock is shown. Such a lock comprises a body 1 having a bore 2 therethrough into which fits a cylinder 3. The cylinder 3 has a slot or opening 4 therethrough and radially aligned bores 5, 5' extend outwardly from the slot through the cylinder wall and into the body respectively. Pins 6, 6' fit into the bores 5, 5', such pins 6, 6' in each bore 5, 5' being of equal combined length but of unequal length with relation to each other. Springs 7 in the outer ends of the bores 5' bear upon the outer ends of the pins 6' to urge the pins, 6, 6' inwardly.

In order to lay a background which may readily bring out the uses of the structures comprising this invention, and in order that the various method steps employed, may be readily apparent, typical lock and key structures will first be described, and then the application of the structures and methods of this invention will be applied to such lock and key constructions.

Figure 6:
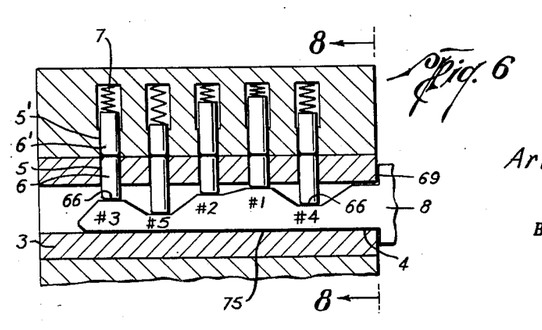
Fig. 6 is a sectional plan view of a pin tumbler lock showing a key inserted therein.
Figure 7:
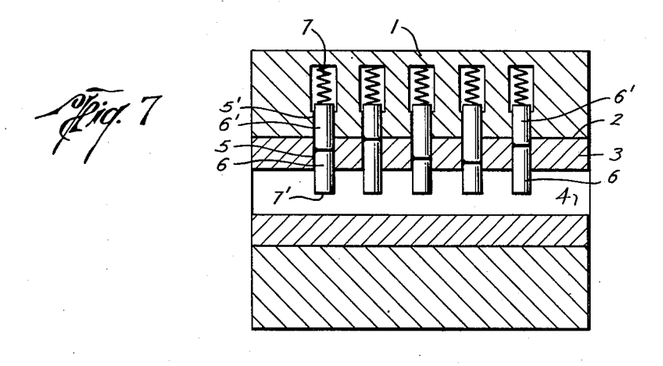
Fig. 7 is a sectional elevation of a pin tumbler lock in locked position.
Figures 8, 9, 10:
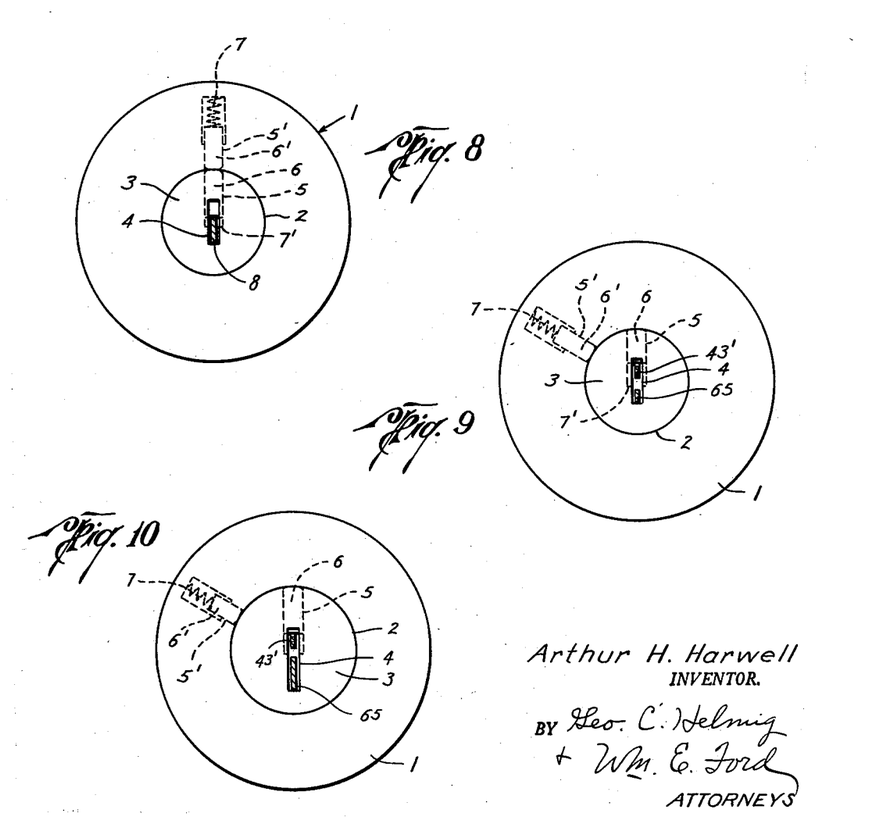
Fig. 8 is a sectional elevation taken along line 8—8 of Fig. 6.
Fig. 9 is a sectional elevation taken along line 9—9 of Fig. 1.
Fig. 10 is a sectional view through structures which are modifications of the structures of Fig. 1.

To put such a pin tumbler lock in locked position, a key 8 is inserted in the opening or slot 4, in the cylinder 3 of the lock, the key being constructed after a fashion to be explained herein below in detail. The key raises the pins 6 in the bores 5 until the outer ends thereof are at the periphery of the cylinder 3. The key is then turned to rotate the cylinder 3 to bring the bore 5 and 5' to co-axial alignment as shown in Figs. 6 and 8.

Then, when the key 8 is withdrawn, the springs 7 urge the pins 6' inwardly until the inner portions thereof extend into the bores 5, as the pins 6' bear upon the pins 6 in such bores.

The cylinder is thus locked against further rotation with relation to the body 1 of the lock, since the pins 6' extend radially in both the body bores 5' and the cylinder bores 5. Obviously to unlock the lock it is only necessary to insert the key 8 to raise the pins 6, 6' to place the outer ends of the pins 6 at the periphery of the cylinder 3, and then to rotate the cylinder by turning the key. As a matter of construction each bore 5 is less in depth than the combined lengths of the particular pins 6 and 6' which extend in such bore, thereby obviating the possibility of both pins 6 and 6' extending completely in the bore 5 so that the spring 7 in the bore 5' extends to the shear line of periphery of the cylinder 3.

Figures 18, 19, 20:
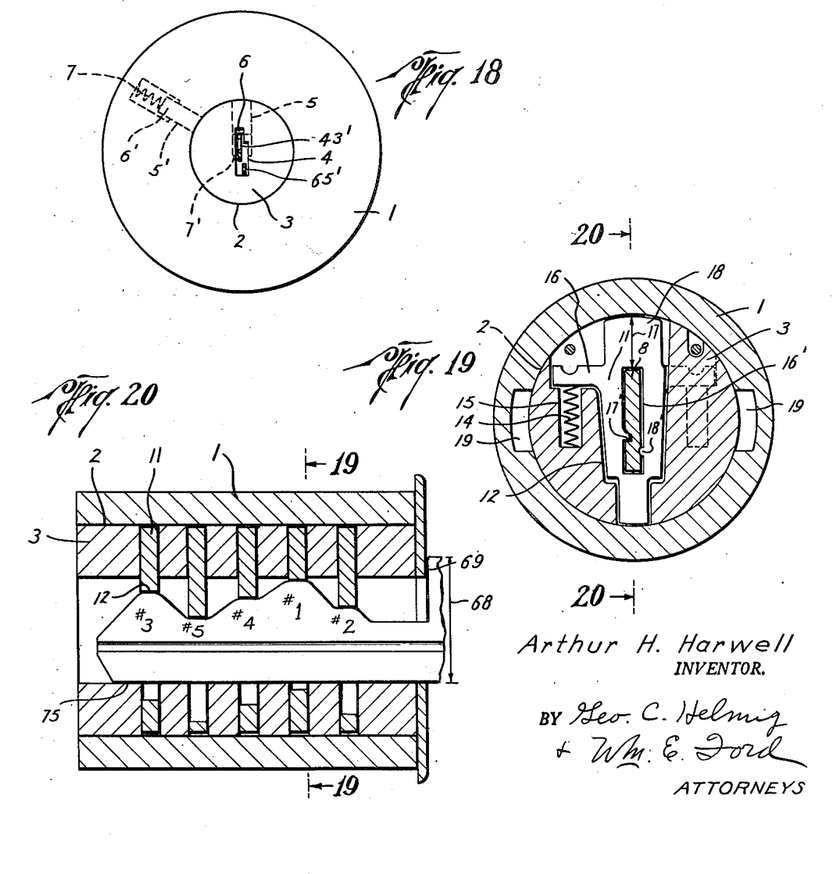
Fig. 18 is a sectional elevation taken along line 18—18 of Fig. 16, and showing the caliper inserted in the lock cylinder of Fig. 15.
Fig. 19 is a sectional elevation through a disc tumbler lock.
Fig. 20 is a sectional elevation taken along line 20—20 of Fig. 19.

In Figs. 19 and 20, a disc tumbler type lock is shown. In this type of lock, the cylinder 3, when in unlocked position, is turned so that the outer ends of the discs 11 are at the periphery of the cylinder 3 within the body 1, the discs fitting in slots or openings 12 in the cylinder, such openings being of the contour shown in Fig. 19. Springs 14 in recesses 15 in the cylinder urge outwardly from such cylinder against the arms 16 of the discs 11.

The slots or openings 16' in the individual discs 11 are of the same length, whereas the distance 17 of the disc heads 18 varies to provide for lock codification. Then the key 8 is inserted in the slot 16', so that the grooves 17' thereof are engaged by the projections 18' on the slot surfaces of the discs 11. The alignment of projections 18' is such that when the key is inserted all of the discs 11 are drawn within the diametrical limits of the lock cylinder 3 so that the lock cylinder can be rotated in the bore 2 of the body or housing 1 to bring the discs out of contact with the grooves 19, 19 thereby unlocking the lock. Then in order to lock the lock, the key 8 is turned to rotate the cylinder 3 to bring the heads 18 of the discs 11 in coincidence with a groove 19 in the body 1. Then, when the key 8 is withdrawn, the springs 14 may urge the arms 16 outwardly to extend the heads 18 into the groove. Obviously the cylinder 3 will be prevented from rotating with relation to the body 1 as long as the discs 11 extend partly in the cylinder 3 and partly in the body 1.

Various locks have various widths of cylinder slots or openings. For instance, in the type of lock shown in Figs. 1, 6, 7, and 8, the key 8 is shown in Fig. 8 as being of substantially uniform width, which width is slightly less than the width of the slot 4. This width dimension is also shown as being somewhat less than the diametrical dimension of the bores 5, 5', since the key slot in which the key is inserted has to be of less width than the diameter of the pins, as the bores 6, 6' into which the pins extend have to be of greater dimension than the key slot to provide the shoulders 7' against which the pins 6 bottom when the lock is in locked position.

Figures 11, 12, 13:
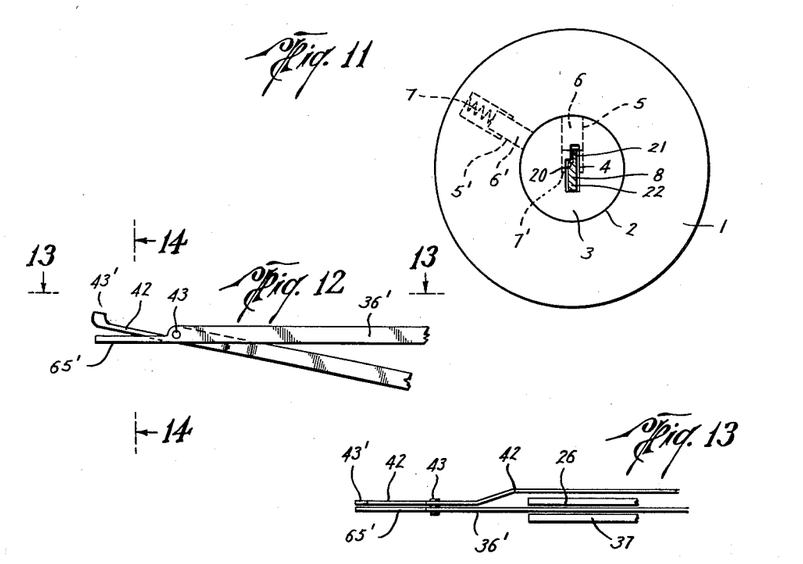
Fig. 11 is a sectional elevation through one form of key blank shown inserted in a lock cylinder.
Fig. 12 is a fragmentary sectional elevation of a modification of the caliper shown in Figs. 1, 2, 4 and 5.
Fig. 13 is a fragmentary sectional plan view taken along line 13—13 of Fig. 12, with frame members shown.

As shown in Fig. 11, the key 8 is relieved at 20 on its left hand side, and the width dimension of the upper right hand portion 21 is some bit less than the diametrical dimension of the bores 5, 5', while the base 22 is substantially wider and slightly less than the width of the slot 4.

Figures 14, 15:
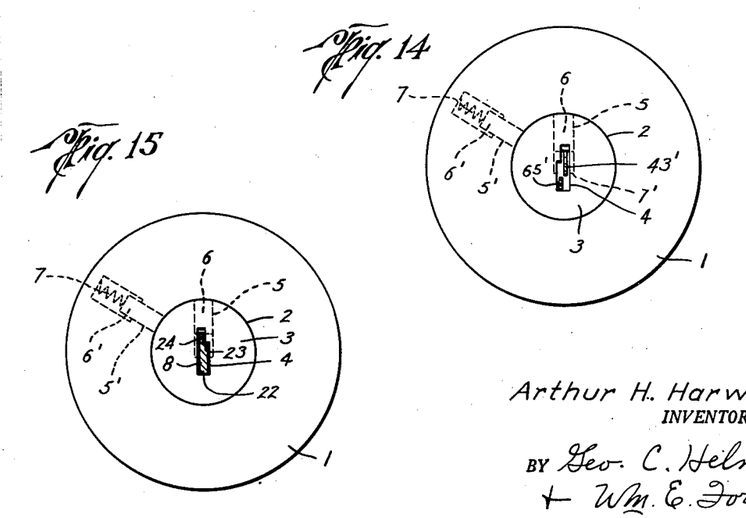
Fig. 14 is a sectional elevation taken along line 14—14 of Fig. 12, and showing the caliper inserted in the lock cylinder shown in Fig. 11.
Fig. 15 is a sectional elevation through another form of key blank shown inserted in a lock cylinder.

As shown in Fig. 15, the key 8 is relieved at 23 on its right hand side, and the width dimension of the upper left hand portion 24 is some bit less than the diametrical dimension of the bores 5, 5', while the base 22 is substantially wider and slightly less than the width of the slot 4.

Having described these variations in lock and key structure, it is pointed out that there are considerable other structural variations of locks and keys, but those hereinabove described are typical, and hereinbelow, the invention will be applied to these above described structures.

It will be assumed that at some out of the way location a lock is desired to be unlocked, as, for instance, the lock to an automobile ignition, the key to such lock being lost and its codification not being known. The lock is of the pin tumbler type disclosed in Figs. 1, 6, 8, and 9, and the key is of the cross-section shown in Fig. 8.

Figure 1:
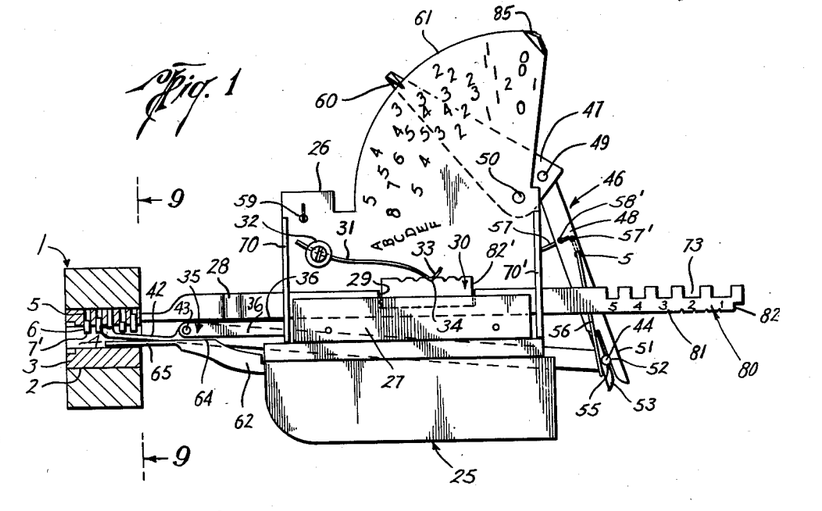
Fig. 1 is a side elevation of one form of the invention, showing its employment with a picked pin tumbler lock shown in cross-section.
Figures 2, 3:
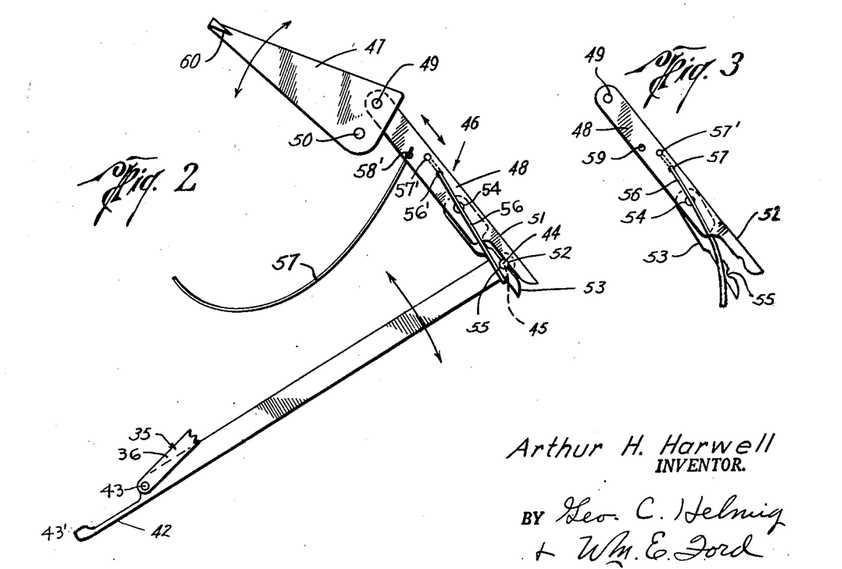
Fig. 2 is a side elevation of the movement multiplier and caliper of the invention.
Fig. 3 is a side elevation of the connector arm of the movement multiplier.
Figure 4:
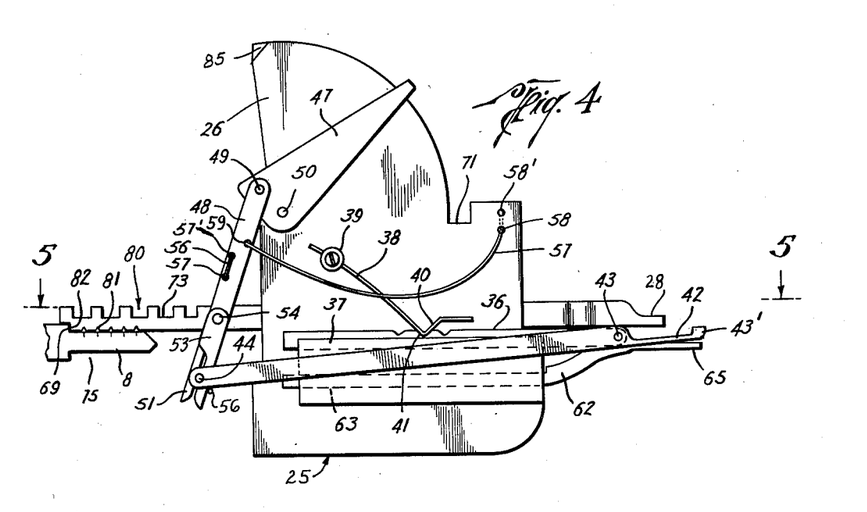
Fig. 4 is a side elevation of the side of the invention opposite the side shown in Fig. 1.
Figure 5:
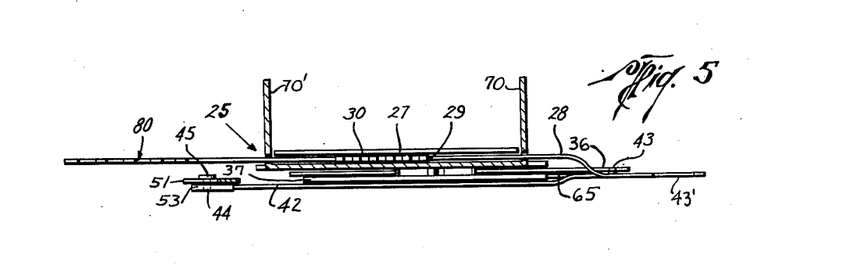
Fig. 5 is a sectional plan view taken along line 5—5 of Fig. 4.

As shown in Figs. 1 and 4, the lock de-coder 25 includes the frame 26 having a bracket plate 27 on one side thereof to provide a slot or groove to receive therein the spacer, or spacer bar 28. This spacer bar 28 has the rectangularly shaped groove 29 therein to receive the rack piece 30. The spring 31 is adjustably fixed at 32 to the frame 26 and at the other end has a detent 33 to bear in the rack teeth 34.

A caliper 35 is also provided, including a holder 36 which fits in a slot or groove provided by the bracket plate 37 attached to the opposite side of the frame 26 from the bracket plate 27. A spring 38 is fixed at 39 to the frame 26 and has a detent 40 which bears in a rack tooth 41 in the holder 36. The caliper also includes a caliper member 42 which is pivotally connected at 43 to the holder 36. This caliper member has the finder probe 43' of substantially rectangular area and having a substantially flat top surface on one end thereof, and has a pin 44 on its other end extending transversely from its surface with a head 45 on the outer end of the pin 44.

A movement multiplier assembly 46 includes the dial arm 47 and the connector arm 48 pivotally connected thereto at 49. Connection is had with the frame 26 by means of the pin or stud 50 thereon on which the dial arm 47 is pivotally mounted. The other end of the connector arm 48 is of reduced cross-section to form the prong 51 having the semi-circular groove 52 therein. A clamp arm 53 is pivotally connected at 54 to the connector arm 48, and has the semi-circular groove 55 therein to complement the groove 52 in the prong 51. A looped spring 56 is curved to bear upon the outer edge surface of the clamp arm 53 outwardly of the groove 55 and is connected at 56', 57' to the connector arm 48.

Connection is made with the caliper member 42 by inserting the pin 44 between the prong 51 and clamp arm 53 until it is brought to the grooves 52, 55, after which the tension of the spring 56 on the clamp arm 53 will keep the pin 44 constrained within the grooves 52, 55, while the head 45 bears against the connector arm 48 and restrains the pin 44 against axial movement. Tension is exerted between frame 26 and connector arm 48 by the spring 57, which is connected at 58, 58' to the frame 26 and at 59 to the connector arm 48.

The dial arm 47 has the re-curved pointer 60 on the end thereof, and the frame 26 has the arcuate portion 61 with the radius thereof centered at the axis of the pivot pin 50. The face of the frame is graduated in equal radially spaced apart graduations, as shown in Fig. 1, the purposes of such graduations to be explained in detail hereinbelow.

A guide or guide bar 62 is provided to fit within slot 63 provided by the bracket plate 37, and this guide has an edge surface 64 in supporting edge to edge contact with the lower edge of the holder 36, the guide terminating in a guide prong 65.

Keys of the types shown in Figs. 6 and 20 are constructed to have equally spaced apart stations or raised flat surfaces 66 against which the pins 6 bear in the pin tumbler type locks of Fig. 6, and which surfaces 67, in Fig. 20, contact the upper surfaces of the disc slots 12. The distance from center to adjacent center of such stations or flat surfaces 66 or 67 is termed the pitch of the key. The key is also cut away to various distances from supplied full key blank width, as shown at 68, the difference of the amounts cut away at different stations varying in accordance with pre-established measurements. The depths of cuts are numbered, the No. 5 cut being the deepest, as shown in Figs. 6 and 20, and the cuts being numbered in accordance with depth, with the No. 1 cut being the shallowest cut.

There is considerable variation in the number of depths of cuts. Some locks have nine different stations instead of the five station type shown in the drawings, and there are types of other numbers of stations as well. Also the method of numbering depths of cuts varies with the shallowest cut in some types being numbered "0."

Prior to employing the de-coder 25 the lock has been "picked" which means probing in the slot 4, by any number of well known conventional methods, until the pins 6 have been moved outwardly until the outer ends thereof are at the periphery of the cylinder 3, and then the cylinder 3 has been turned to position the bores 5, 5' and consequently the pins 6, 6' out of co-axial alignment.

When the spacer bar or spacer 28 is drawn toward the frame to place the detent 33 in the rack tooth 34 farthest to the left, as shown in Fig. 1, the finder probe 43' and guide prong 65 will extend to the farthest position from the end of the spacer bar 28. Therefore, since the rack teeth 34 are at the same pitch or distance apart as the key stations in the key to be cut, such finder prong 43' and guide prong 65 may be inserted into the slot 4 to a depth equal to the distance from the key shoulder 69 to the outermost station of the key 8, as the spacer 28 bears against the outer face of the cylinder 3 to guage the depth of such insertion.

The operator may then hold the frame 25 by grasping the handles 70, 70', as between index finger and thumb of the left hand, and may probe with the caliper member 42, as by light finger force applied adjacent the connection of caliper member 42 and connector arm 48, and by thus probing move the innermost pin 6 outwardly until its outer end is at the periphery of the cylinder 3 while the finder point 43' bears against its inner end.

The length of the pin tumblers 6 correspond with the depth of cut made in the key at the corresponding station. Hence to measure a shallow cut depth the finder probe 43' moves a greater distance upwardly from the base of the slot 4 on which the guide prong 65 rests, than it must move to contact the inner end of a longer pin 6 to measure a deeper cut.

The dial arm 47 is normally rotated by the tension of the spring 57 to rest at the top corner or extreme right adjacent the No. 1 position as shown in the graduation of the dial surface 61, in Fig. 1. From this position it will move to the left as the finder probe 43' is moved a greater distance, until the greatest travel is indicated when the dial arm pointer 60 indicates the No. 5 position on the dial surface graduations.

Prior to arriving at the position shown in Fig. 1, the de-coder has been employed to probe the innermost pin 6, as hereinabove described, and the code reading of "3" has been recorded after observing the dial pointer position attained adjacent the graduation "3" on the dial surface. Then the spacer 28 has been moved to the left as shown in Fig. 1 to place the detent 33 in the rack tooth 34 adjacent the last tooth to the left, and the decoder has been employed to render a dial reading of 5 for the station adjacent the innermost station.

The spacer 28 has then been moved with relation to the frame 28 to position the detent 33 in the rack tooth 34 as shown in Fig. 1, and the finder probe 43' is shown bearing against the inner end of the pin 6 and moving it outwardly as the dial arm is being rotated to the right. When the pin 6 is probed until its end is at the outer periphery of the cylinder 3, the pointer 60 will be adjacent the code designation "2" on the outer arc of numbers to indicate the depth of cut required at the central station to duplicate the key shown in Fig. 6.

Said in other words, the caliper is constructed to measure the distance from the straight lower or back edge 75 of the key blank to the station surfaces 66 or 67, and the distance from the lower or key slot surface contacting edge of the guide prong 65 to the point of the finder probe member 43', in effect amounts to this distance. In detail, these distances are catalogued, as they have been evolved by standard practice:

| Cut No.: | Width of key blank, inches |
|---|---|
| 1 | .275 |
| 2 | .260 |
| 3 | .245 |
| 4 | .230 |
| 5 | .220 |
| 6 | .208 |
| 7 | .194 |
| 8 | .180 |
| 9 | .165 |

By moving the spacer 28 successively to the left, as shown in Fig. 1, and then using the de-coder to obtain readings, in succession, for the next to the outermost, and then for the outermost station, code numbers and sequence will be obtained, reading from innermost station outwardly, "3, 5, 2, 1, 4," in accordance with the codification of key 8, shown in Fig. 6. The operator may then take a key blank, and knowing the standard distance from the key shoulder 69 to the first key station, and knowing the key station pitch, the operator has information which should enable him to cut a key in the field, as by filing, which will fit the lock.

In order to assist the locksmith in taking measurements as he files a key on location to correspond with the code he has deciphered for the key, the spacer 28 has a gauge on the outer end thereof, such gauge consisting of slots 73 of successively decreasing widths, such widths corresponding with the standard distances from the straight base edge 75 of the key blank to the station surfaces 66 or 67. Thus it is only necessary to file the key blank until it fits in the slot corresponding with the desired width of key blank for the station being filed.

As shown in Fig. 4, spacer bars 28 may be provided with a gauge for measuring the station spacing, the indentations 81 being spaced apart the distance between stations, and being gauged from the indexing point 69 of key contact with the shoulder 82.

In order to caliper locks unlocked by keys of the type shown in Fig. 11 with the base 22 being slightly less than the width of the slot, but only with the right hand portion of the key being designed to contact the pins 6, it is desirable, as shown in Fig. 14, that the guide prong 65' contact the base and the lower left hand side of the slot 4, while the finder probe 43' is to the right of the guide prong 65' and under the pins 6. It is necessary in this regard to have a blade or caliper member of very narrow edge or transverse dimension, since the probing action could not be sensitively and accurately conducted if a caliper of the type employed for the narrow slot 4 of Fig. 9 were employed wherein the caliper member finder probe 43' operates directly above the guide prong 65'. In such case the finder point must be of substantially less thickness than the width of the base of the slot 4, while affording such contact with the pins 6 as to inform the operator at the instant of pin contact, and as to the fine degree of further contact required.

Such a caliper as will best serve for the lock and key of Fig. 11, is not shown with a separate guide bar for support, as serves the guide bar 62 shown in Figs. 1, 4, 5, and 9. Rather there is employed the guide prong 65' shown in Figs. 12–14, which is connected to or forms an integral part of the holder 36'. Thus the holder 36' is fitted into the slot of the bracket plate 37, while the guide prong 65' extends therefrom into the slot 4 to rest against the base and left side thereof to serve as the guide and reference positioner for the caliper member finder probe 43'. The caliper member 42 is curved outwardly to avoid the frame 26, and it has the same outer end construction as shown in Figs. 1, 2, 4, and 5, aligned and adapted for connection to the connector arm 48.

In order to caliper locks unlocked by keys of the type shown in Fig. 15 with the base 22 being slightly less than the width of the slot, but with only the left hand portion of the key being designed to contact the pins 6, it is desirable, as shown in Fig. 18, that the guide prong 65' contact the base and the lower right hand side of the slot 4, while the finder probe 43' is to the left of the guide prong 65' and under the pins 6. The same reasons favor this type of caliper construction for the lock and key shown in Fig. 15, as have been set forth hereinabove in favor of the caliper construction of Figs. 12–14 for the lock and key construction of Fig. 11.

Figures 16, 17:
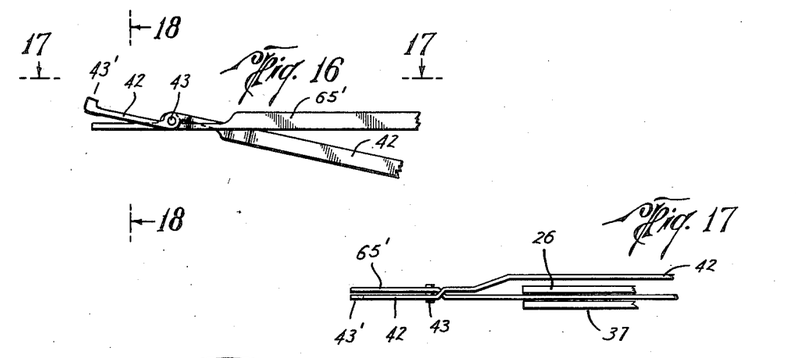
Fig. 16 is a fragmentary sectional elevation of still another modification of caliper.
Fig. 17 is a fragmentary sectional plan view taken along line 17—17 of Fig. 16, with frame members shown.

In this type of caliper, as in that shown in Figs. 12–14, the holder 36' and guide prong 65' are connected or integrally formed, and the guide prong 65' extends therefrom into the slot 4 to rest against the base and right side thereof to serve as guide and reference positioner for the caliper member finder probe 43'. The caliper member 42 has to be connected to the connector arm 48 by the same construction, and on the same side of frame 26 as in the case of the caliper members described hereinabove, whereas the guide bar 36' fits into the groove of the bracket plate 37. However, since the finder probe 43' must work to the left of the guide prong 65', as shown in Fig. 18, it is necessary that the caliper member 42 cross over the holder 36', as shown in Figs. 16 and 17.

In certain types of locks, as shown in Fig. 10, the slot 4 is substantially longer than the slot 4 shown in Fig. 9. On the other hand the slot width is substantially equal in each figure. In such a case if the amount of travel of the finder probe 43' is calibrated for one dial graduation, it will be necessary to provide the guide prong 65 shown in Fig. 10, which is of sufficiently greater height than the guide prong 65 shown in Fig. 9, in order to employ the same dial graduation of the dial surface 61.

As shown in Fig. 1, the dial surface 61 of the frame 26 may be graduated along arcs of various radii, to conform to various standards of finder point travel. Thus for smaller pin tumbler locks, where the gradations between various lenghts of the pins 6 are in smaller increments, or for smaller disc tumbler locks where the gradations between various heights of the slots 12 are in smaller increments, the dial graduation for a five station lock may require an arc of lesser degrees.

Figure 21:
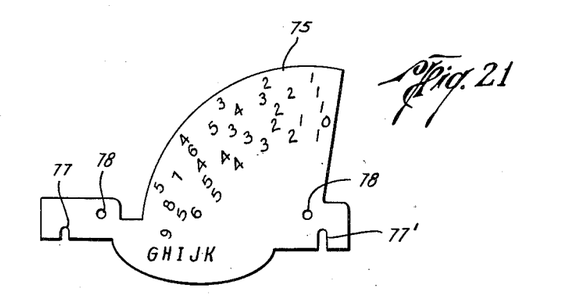
Fig. 21 is a side elevation of a gauge plate removeably mountable on the frame of this invention.
Figure 22:
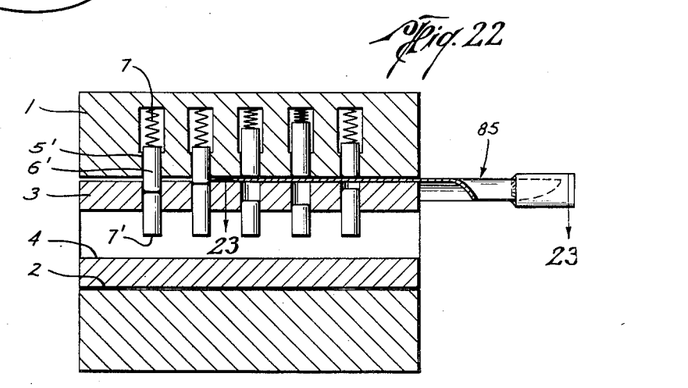
Fig. 22 shows a pick shim, part in section, and being employed to pick a pin tumbler lock.
Figure 23:
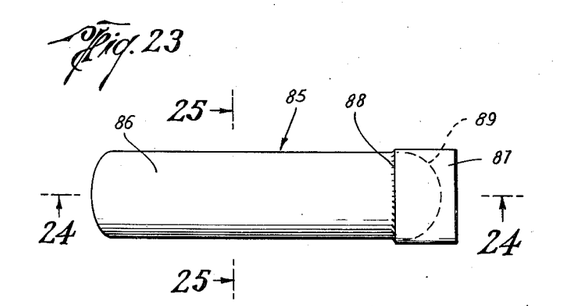
Fig. 23 is a plan view of the pick shim shown in Fig. 22, taken along line 23—23 of Fig. 22.
Figure 24:
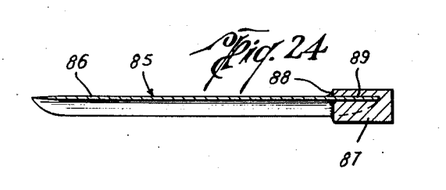
Fig. 24 is a longitudinal sectional elevation of the pick shim taken along line 24—24 of Fig. 23.

The variations in which locks are made, including variations in numbers of stations, are multiple, and the letters A, B, C, D, E, and F appearing on the dial surface 61 of the frame 26 only identify six of the many arcuate graduations which may be employed, with appropriate spacers 28 and calipers 35, for any single frame and multiplier assembly 46. As the dial surface 61 has a limited area, dial plates 75 as shown in Fig. 21 are provided to be superimposed over the dial surface 61 so that other graduations may be used with the same frame 26. In this case the grooves 77, 77' in such plate 75 may slide over the handles 70, 71' of the frame 26, and the dial plate may be further secured, as by small screws or clips passed through the holes 78 and into the frame 26.

Additionally locks vary as to the pitch, or distance apart between stations 66 or 67, and as to the number of stations. Thus there is variation in the length or depth of the slot 4 or opening 12 in lock cylinders 3. To employ the same spacer bar 28 while adapting it for more than one pitch, inserts 30 of various pitch distances between rack teeth 34 may be installed in the spacer bar slot 29, it only being required that the insert 30 in each case is substantially the length of the slot 29.

In every case the method of employing the structure is generally the same. First the lock is "picked." Then the caliper adaptable for de-coding the lock is selected and employed to probe the stations from the innermost toward the outside. The spacer bar being moved one pitch away from the frame for the measurement of each successive station, the successively obtained readings being recorded. A key is then cut in the field or shop, the distance from shoulder to outermost pitch station being known and the same as the distance from the end of the spacer bar which bears against the face of the cylinder 3 to the finder probe 43' when in its outermost position to probe the outer pin 6 or disc 11. The pitch or distance between stations is known, and the gauge 80 having the slots 73 therein is available to gauge the filing of the key blank. Thus a method is provided by which an unknown lock may be decoded in the field and a key made therefor in a reduced amount of time over known conventional methods, as where an impression of the interior of the cylinder 3 must be taken.

Figure 25:
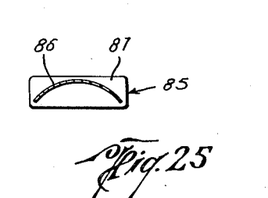
Fig. 25 is a transverse sectional elevation of the pick shim, taken along line 25—25 of Fig. 23.

In the picking of locks hereinbefore referred to, a preferred tool is shown in Figs. 22–25. This lock pick 85 has a probe or pick 86 of very thin material, such as shim steel, which is bent in arcuate cross-section, as shown in Fig. 25, such cross-section being obtainable by the method of connecting such shim or probe to the handle 87. This connection can be made, as by brazing or soldering at 88, after first arcuately grooving or recessing the handle, as at 89, to receive the end of the shim in bent or arcuate configuration.

In the selection of shim stock, it has been found necessary to select a material, as specially tempered steel, of not greater than .002" thickness, as lock tumblers are limited to such tolerances in construction.

In use, the shim is inserted along the shear line between the cylinder 3 and body 1 of the lock to be picked, and by manipulation, the first pin 6' is maneuvered above the shear line and into the bore 5' above the shim 86. Then the shim 86 is advanced inwardly along the shear line to maneuver successive pins 6' into the bores 5' thereabove. When the last pin 6' has been thus maneuvered, the cylinder 3 may be rotated in the body or housing 1 to place the pin and bore axes of cylinder and body out of co-axial alignment. A similar probing method employed along the shear line between cylinder and body of disc tumbler locks may be employed to work the discs 11 below the shear line and shim and out of the groove 19 so that the cylinder may be rotated to move the discs 11 and grooves 19 out of alignment.

The frame 26 includes the graduation dial 61 or else a dial plate 75 is mounted thereon. The dials are of such a size that a definite spacing between station indications is obtained, whereby the position of the pointer 60 with relation to any station indication can indicate to the operator whether or not the measured device at any station, as the pin or disc, may have been worn in service, so that, following such indication, compensation may be made when the key is fabricated.

As an example of the lowest common denominator theory of design employed in this invention, the types of calipers employed may be considered. Locks of general purpose are constructed with key slots of a wide variety of cross-sectional area configurations, but all such cross-sectional areas fall in the three general categories of those having the base area directly below the upper area; those having a base area equal to or greater than the upper area and extending to the right thereof; and those having the base area equal to or greater than the upper area and extending to the left thereof. Thus the type of caliper shown in Figs. 1, 2, 4, and 5; the type of caliper shown in Figs. 12–14; and the type shown in Figs. 16–18 combine in furnishing the necessary general purpose structures for the various lock cylinder slots generally encountered.

In this regard, it is stated that the slot and key configurations of Figs. 11 and 15 are quasi-diagrammatical to illustrate a principle and it is herein pointed out that whereas the slots 4 of these figures show a base 4' of greater width than the upper part of the slot, there are other slot configurations in which the slot base may be either to the right or left of the upper portion of the slot, which communicates with the base in offset relation, in which case the slot base need not necessarily be of greater width than the upper portion of the slot. In such case the key required will be of corresponding cross-section to fit within the slot. In such cases the calipers employed, as those shown in Figs. 14 and 18, can be inserted with the finder probe 43' initially pivoted to an extent to extend sufficiently above the guide prong 65' to permit the insertion of the finder probe 43' into the offset upper portion of the slot at the same time the guide prong 65' is inserted into the lower portion of the slot.

In considering the various adaptation of the structures of this invention it is pointed out in passing that the inserts 30 may themselves be employed in place of the gauge 80 to measure station spacing, it only being necessary that the distance from the insert end edge 82' to the first tooth groove 34 is the same as the distance from the key shoulder 69 to the first station marking.

The spring 57 is mounted to urge the link or connector arm 48 downwardly, as shown in Figs. 1 and 4, so that the arm 47, which comprises the movable gauge part, moves clockwise as shown in Fig. 1 and counter-clockwise as shown in Fig. 4. To provide the arm 47 from being rotated beyond the limits of the frame, as when the de-coder is not engaged with a lock cylinder slot, a stop 85 is provided on the quadrant or stationary gauge part, as by simply off-setting the corner of the quadrant from the plane of the frame to limit rotation of the pointer 60. In regard to the movable and stationary gauge parts, it is pointed out that optionally the graduated quadrant may be the rotatable member, while the frame can provide a straight edge or pointer as shown in Figs. 1 and 2 of my co-pending application Serial No. 316,976, filed October 27, 1952.

This invention has been effected to meet the demand for a general purpose lock de-coder and method of de-coding the vastly increased number of locks which have been placed on the market in the last three decades. Without such a de-coder, it has heretofore been necessary either to laboriously make an impression of the lock interior to obtain the information from which a key could be constructed, or else, it has been necessary to take the lock apart to obtain access to a locked structure and to obtain the necessary data for constructing a key.

Considering Fig. 4, it can be seen that the decoder is adapted for probing key slots of various heights by virtue of the adjustability of the holder 36 with relation to the detent 40 which can be fitted in the various rack teeth 41 to move the caliper member 42 forwardly or rearwardly. If moved forwardly the angle the finder probe supporting end of the caliper member makes with the guide prong 65 is increased with the consequence that the finder probe 43' rides higher in the key slot so that a taller key slot can be more easily probed. As the holder bar is thus moved forwardly the angle between the caliper member 42 and the linkage between movement multiplier assembly 46 and the outer end of the caliper member 42 is correspondingly increased. As such adjustment is carried out the spacer bar 28 may also be correspondingly adjusted with relation to the dent 33 as it may bear in various rack teeth 34. Thus the distance between spacer bar end bearing against the lock cylinder face and the finder probe 43' can be adjusted to function with finder probe operative height adjusted for various height key slots.

Having set forth the background structure and method in which this invention operates, the particular advantages of the invention will be set forth, reference being made to Figs. 26–31 inclusive.

Figure 26:
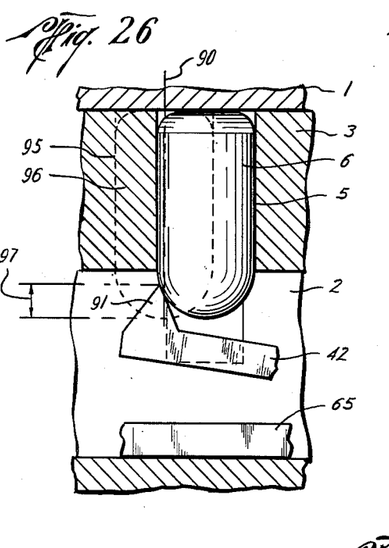
Fig. 26 is a fragmentary sectional elevation through a lock and lock cylinder showing an off-station pin tumbler being calipered by a pointed caliper member, and the error resulting in measurement.
Figure 27:
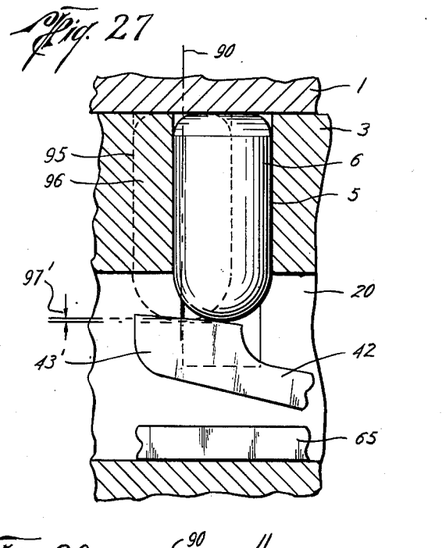
Fig. 27 is a fragmentary sectional elevation through the same lock and lock cylinder showing the same off-station pin tumbler being calipered by the caliper member of this invention and the reduced error resulting in measurement.

Considering Figs. 26 and 27, the axis line 90 in each figure represents the proper axis of a station. This is the axis line of a station spaced the standard or uniformly calculated distance from the face of the lock cylinder 3 against which the spacer bar 28, hereinabove described, has been set to accurately place the finder probe or caliper member in position to accurately caliper the tumbler at this station. This accuracy of spacing results in a substantially central point on the finder probe 43', (Fig. 27), or in substantially the point of the finder point 91, (Fig. 26), intersecting the axis line 90 at substantially the bottom of a pin tumbler whose axis is substantially coincident with the axis line 90.

However, let a condition be considered in which the stations of a lock are not moulded or formed according to standard form, so that a station or opening for a tumbler falls out of its pre-determined spacing from the face of the lock cylinder 3. In such a case, the bore 5 to receive the pin tumbler 6 may be located as shown in Figs. 26 and 27, and off-center from the axis line 90. Under these conditions, a finder probe 43' (Fig. 27), or a finder point 91, (Fig. 26), will contact the tumbler, not at or adjacent to its lowermost position, but sidewardly thereof.

However, because of the length of the upper face of the finder probe 43' as it extends on both sides of the theoretically accurate axis line 90, and because of the slight angle it makes to the horizontal, as viewed in Fig. 27, it will contact the tumbler 6 only slightly above its lowermost point. Thus the error, as compared with accurate contact made with a tumbler 96 of corresponding length, located accurately in a bore 5 having its axis as axis line 90, is minimized to the indicated vertical dimension 97'.

On the other hand, considering a finder point 91 operable under the same conditions, such point will contact the pin tumbler 6, as shown in Fig. 26, substantially above the lowermost point thereof and to the side thereof, so that the error, as compared with the accurate contact made with a tumbler 96 of corresponding length, located accurately in a bore 5 having its axis as axis line 90, amounts to the substantial indicated vertical dimension 97.

Considering the operation of the decoder, as hereinabove described, vertical differences in finder point or probe position are translated through the caliper member 42 to the multiplier assembly 46 and dial arm 47 to positions of the pointer 60 with relation to the graduations on the arcuate portion or quadrant 61. Thus, for a great inaccuracy, the pointer 60 may be closer to, and can indicate to the operator an adjacent graduation, rather than the graduation for which the key blank should properly be cut. Such can easily occur in the case of a lock cylinder and lock which have stations improperly moulded or formed, and in the mass production of locks, as those of the cheaper quality, these inaccuracies inherently occur.

In regard to inaccuracies, it is pointed out that whereas the pin tumblers in Fig. 6 for instance, are shown as having flat bottoms, these bottoms are not necessarily flat in all cases, but some are rounded or hemi-sperical, and some become rounded through wear. Thus the pin tumblers 6 as shown in Figs. 26 and 27 are not too far from the norm of pin tumblers.

In reference to disc tumblers, which in practice are of much less thickness than are the pin tumblers in diameter, the moulding or forming of the slots 12 for these members can vary to the extent of substantial inaccuracy from the proper station point and for purposes of illustration a condition is shown where an off-station slot 12 is in completely spaced, and not in overlapping relation to the proper slot 95 through which passes the axis line 90. See Figs. 28 and 29.

In this case a finder point 91, (Fig. 28), operable to contact the surface of a disc 96 in a properly located slot 95 on an accurate station 90, may contact an inaccurately located pin tumbler 11 as shown with the resultant error 97 from the conditions under which the decoder may be designed. In such a case this error, when transmitted through the decoder mechanism to the pointer, may result in the pointer indicating at least a station away from the proper station.

Figures 28, 29:
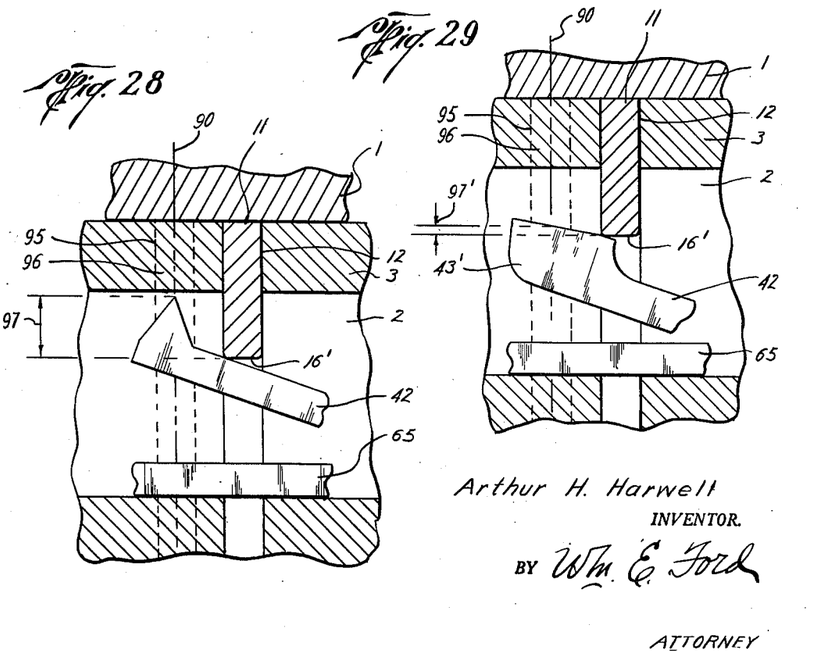
Fig. 28 is a fragmentary sectional elevation through a lock and lock cylinder showing an off-station disc being calipered by a pointed caliper member, and the error resulting in measurement.
Fig. 29 is a fragmentary sectional elevation through a lock and lock cylinder showing the same off-station disc being calipered by the caliper member of this invention and the reduced error resulting in measurement.

Considering Fig. 29, where as finder probe 43' is employed, the error resulting when such an off-station disc tumbler 11 is calipered is much less than with a pointed caliper, since only the vertical measurement 97' is the measure of the error. This error, transmitted through the decoder to the pointer 60 can be relatively inconsequential and will result in the pointer 60 registering much nearer to the proper graduation than to any adjacent graduation. Thus, with reliance, the operator may record the graduation nearest the pointer for the depth of cut indicated.

Figure 30:
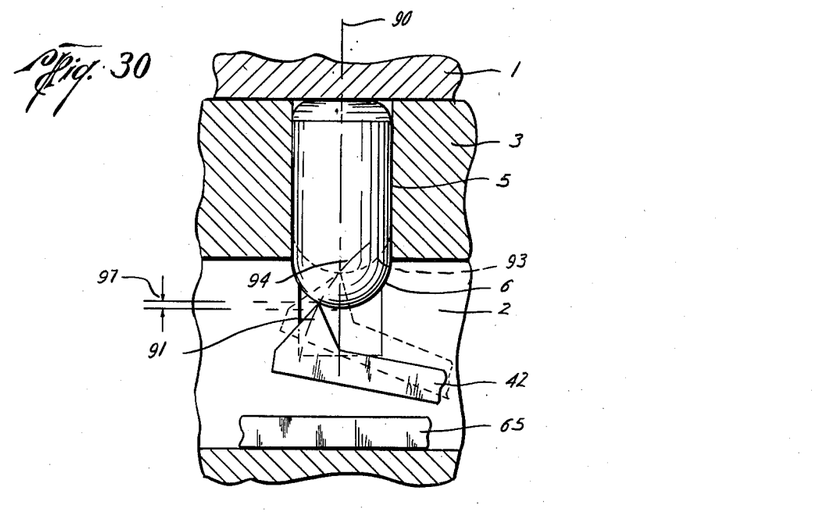
Fig. 30 is a fragmentary sectional elevation through a lock and lock cylinder showing a pin tumbler of one length being calipered by a pointed caliper member, and the error resulting in measurement as compared with accuracy obtained by measuring a pin tumbler of another length at the same station.
Figure 31:
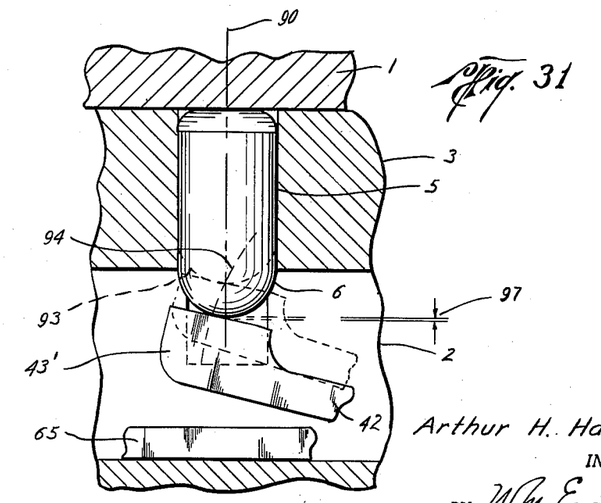
Fig. 31 is a fragmentary sectional elevation through a lock and lock cylinder showing the same pin tumbler being calipered by the caliper member of this invention, and the slight error resulting in measurement as compared with accuracy obtained by measuring the same comparable pin tumbler of the same other length at the same station.

If consideration is given to Figs. 30 and 31 it will be noticed that the finder point 91, (Fig. 30), and the finder probe 43', (Fig. 31), are shown as travelling in an arc 94 which crosses the axis line 90. In the design of the decoder the intersection of this arc 91 with the axis line 90 is calibrated to occur at the bottom point of a tumbler as the tumbler 93. Thus at other points of travel along the arc, the point of contact with a tumbler, as with one of greater length than the tumbler 96, for instance the tumbler 6, engagement will occur off center from the axis line 90 and a variation from the gauging tumbler contact point will occur. As shown in Fig. 30, where a finder point 91 is employed as the calipering element, the difference in vertical distance between the point of contact of the finder point 91 with the tumbler 6 and the lowermost point of such tumbler is designated by the distance 97.

On the other hand, as shown in Fig. 31, the finder probe 43' of a configuration to provide a probing surface which extends at a slight angle to the horizontal, will contact the cylinder 6 at a point on the arc 94 which is only the minute vertical distance 97' above the lowermost point of the cylinder 6.

It is obvious that a finder probe 43' which provides a substantially long surface in the general direction of the lock cylinder axis, and which surface extends at no more than a slight angle to the horizontal when in operative position, will minimize error as registered by the pointer 60 in distance from a quadrant graduation. Such reduction of error, as compared with other probe or caliper element shapes, takes place as regards error resulting from the moulding or forming of stations out of gauge location, as regards error resulting from the worn or convex shape of the bottom of a tumbler, and as regards inherent error resulting from the necessity of the calipering element or finder travelling arcuately from a gauge position.

Obviously the shape of the finder probe 43' is determined by operative limitations. As probing requires great finger sensitivity on the part of the operator, it is desirable that the actual probing surface be raised or extended from the caliper member 42 and inherently in the direction of the tumblers to be probed, and thus there is imparted to the operator the knowledge that in probing a tumbler has been contacted by the probing surface. Additionally the finder probe is raised from the surface of the caliper member 42 in the direction of the tumblers to be probed in order to lessen the time expended in travel from lowered position to tumbler contacting position. On the other hand the caliper member 42 outwardly of the finder probe 43' must be reduced in vertical height as much as possible. This is true since the case arises where the finder probe 43' must probe a very short tumbler in station just inwardly of a very long tumbler, with the consequence that the vertical height of the caliper member adjacent the finder probe has to be very small to permit clearance of the long tumbler as the finder probe 43' probes the adjacent short tumbler.

The various devices of this invention have been developed with the object of providing a minimum of interchangeable calipers, graduation dials, gauges, spacers, and spacer inserts, and guide bars, designed as lowest common denominator structures to operate upon a common frame with a common reading multiplier to de-code the various lock constructions now in use in the field of general purpose locks.

An operator with knowledge of the various station pitches station numbers, depths of cuts, and slots cross-sections of the general field of locks for which this invention is employed may go to any location and selectively arrive at the combination of devices to be employed together on the frame of this invention to permit a rapid decoding of the lock so a key may quickly be made therefor.

Broadly this invention considers a lock de-coder capable of de-coding a lock on station without making a model or impression, and more particularly this invention considers such a de-coder having a caliper contacting element adapted to minimize inaccuracies in tumbler form and location, and also inaccuracies resulting from the inherent arcuate travel of the tumbler contacting element of the caliper.

What is claimed is:

1. A lock decoding frame assembly comprising a plate including a bar supporting portion and an indicia marked stationary gauge part portion, a slot on one side of said plate and spaced from said stationary gauge part, a toothed rack spacer bar received in said slot with an end to bear against the lock cylinder face of a lock to be decoded, resiliently yieldable detent means carried by said plate to bear upon said rack one tooth at a time to position said spacer bar with relation to said plate, slot means provided on the opposite side of said plate from said slot, caliper cooperative means including a notched bar supported in said slot means and a guide prong insertable in the slot of said lock cylinder, a caliper bar pivotally connected to said caliper cooperative means and having a finder probe end to extend into said lock cylinder slot to probe measurement of the tumblers therein, a second resiliently yieldable means carried by said plate to bear upon said notched bar one notch at a time to position said notched bar with relation to said plate, a movable gauge part pivotally mounted on said plate to cooperate with said stationary gauge part in indicating coded key blank depths of cut in correspondence with probed tumbler measurements, and connection means pivotally connecting the end of said caliper bar opposite its probe end to said movable gauge part including yieldable means urging to rotate said movable gauge part to an initial position with relation to said stationary gauge part whereafter caliper bar probe movement is translated by movable gauge part rotation into coded key blank depths of cut indicated on said stationary gauge part, said probe having a substantially flat surface to extend in operation substantially transverse to the longitudinal axes of the tumblers of said lock cylinders whereby said flat surface contacts substantially the lowermost part of the tumbler surface to the probed regardless of tumbler position variance from standard tumbler spacing distance and thus probing motion translated by said caliper bar to said movable gauge part positions said movable gauge part in close indicating adjacency to proper indicia of said stationary gauge part.

2. A method of decoding a tumbler type lock comprising the steps of, moving the lock tumblers to effect an unimpeded shear line to permit relative rotary movement between the lock cylinder and lock body, effecting such relative rotary motion to disrupt communication between the openings in lock cylinder and lock body which communicate in locked position, selecting from lock decoding calipers, a caliper to operate in the lock cylinder slot and selecting from rack toothed spacer bars a bar with rack teeth spaced apart at intervals equal to the pitch between tumbler stations, mounting the selected caliper guide bar on a decoding frame, mounting the caliper bar with its shorter end portion to pivot on the frame and releasably connecting the other longer end of the caliper bar to the frame supported motion multiplier therefor and slidably inserting the selected spacer bar in the holder of the frame so that a spacer bar rack tooth in resiliently, yieldably engaged by the frame mounted detent, inserting the guide bar and caliper bar in the lock cylinder slot and moving the frame with relation to the spacer bar as the detent bears in the various station locating rack teeth and the spacer bar shoulders against the lock cylinder face, and employing the finder probe of the caliper bar to contact the tumblers at each station to measure the depths of key cut therefore and observing such measurements as multiplied by the code graduation traverse of the multiplier.

3. Lock decoding apparatus for employment in decoding a tumbler type lock having a lock cylinder rotatable in a lock body and tumblers extending when in locked position in radially extending inner-communicating openings in both said cylinder and said body, there being an axially extending slot in said cylinder communicating with said cylinder openings, said apparatus comprising, means to effect an unimpeded shear line to permit relative rotary movement between the lock cylinder and lock body and means to relatively rotate said cylinder and body to place said lock in picked position, a series of calipers for selective employment in decoding locks of the tumbler type, each caliper including a guide bar having an end insertable in a cylinder slot and a caliper bar having a finder probe insertable in such slot to selectively contact the tumblers in the cylinder, racked tooth spacer bar means including a series of toothed racks for selective employment in decoding locks of the tumbler type, each rack having teeth spaced apart the pitch distance between tumblers of a lock cylinder, a decoding frame to pivotally support said caliper bar adjacent the finder probe end thereof and to support said guide bar and to slidably support said spacer bar, said frame having a detent spring mounted thereon to selectively, resiliently, yieldably engage said rack teeth said frame including a multiplier comprising a graduated gauge for indicating code readings of the tumblers engaged by said probe including a stationary gauge part carried on said frame and a movable gauge part having a code indicating end portion, a motion transmitting link yieldably, resiliently and pivotally connected to the other longer end of said caliper bar at a distance from the pivotal mounting of said caliper bar on said frame which is a substantial multiple of the distance from said caliper bar pivotal mounting to said finder probe, and pivotally connected to the end portion of said movable gauge part opposite said code indicating end portion, means pivotally mounting said movable gauge part on said frame at a distance from said code indicating end portion which is a substantial multiple of the distance from said pivotally mounting means to said link connected end portion so that the movement of said code indicating end portion with relation to said stationary gauge part is the product of the finder probe travel in measuring the tumblers to be decoded multiplied by said multiples and so that the assembly of said caliper bar, said link, and said movable gauge part are accessible outside of said frame for easy movement upon slight manual touch at any point thereon, and a spring detent carried by said frame in spaced relation from said assembly and engageable with one of said rack teeth at a time and releasable therefrom upon manual thrust upon said frame as motion of said spacer bar at the end adjacent the finder point is opposed to selectively position the opposed end of the spacer bar with relation of said finder probe.

4. A method of decoding a tumbler lock comprising the steps of, moving the lock tumblers to effect an unimpeded shear line to permit relative rotary movement between the lock cylinder and lock body, effecting such relative rotary motion to disrupt communication between the openings in lock cylinder and lock body which communicate in locked position, selecting from lock decoding calipers a caliper to operate in the lock cylinder slot and selecting from rack toothed spacer bars a bar with rack teeth spaced apart at intervals equal to the pitch between tumbler stations and selecting from graduated disks graduated to multiply the depths of coded key cuts measured by the selected caliper, mounting the selected caliper guide bar on a decoding frame, mounting the caliper bar with its shorter end portion to pivot on the frame and releasably connecting the other longer end of the caliper bar to the frame supported motion multiplier therefor and slidably inserting the selected spacer bar in the holder of the frame so that a spacer bar rack tooth is resiliently, yieldably engaged by the frame mounted detent and mounting on the decoder the graduated disk to cooperate with the multiplier to indicate by multiplied measurement the caliper measured depths of coded key cuts, inserting the guide bar and caliper bar in the lock cylinder slot and moving the frame with relation to the spacer bar as the detent bears in the various station locating rack teeth and the spacer bar shoulders against the lock cylinder face, and employing the finder probe of the caliper bar to contact the tumblers at each station to measure the depths of key cut therefor and observing such measurements as multiplied by the code graduation traverse of the multiplier.

5. Lock decoding apparatus for employment in decoding a tumbler type lock having a lock cylinder rotatable in a lock body and tumblers extending when in locked position in radially extending inner-communicating openings in both said cylinder and said body, there being an axially extending slot in said cylinder communicating with said cylinder openings, said apparatus comprising, means to effect an unimpeded shear line to permit relative rotary movement between the lock cylinder and lock body and means to relatively rotate said cylinder and body to place said lock in picked position, a series of calipers for selective employment in decoding locks of the tumbler type, each caliper including a guide bar having an end insertable in a cylinder slot and a caliper bar having a finder probe insertable in such slot to selectively contact the tumblers in the cylinder, spacer bar means including spacer bars and a series of spacer bar tooth racks for selective employment in decoding locks of the tumbler type, each rack having teeth spaced apart the pitch distance between tumblers of a lock cylinder, a decoding frame to pivotally support said caliper bar adjacent the finder probe end thereof and to support said guide bar and to slidably support a spacer bar, said frame having a detent spring mounted thereon to selectively, resiliently, yieldably engage said rack teeth, a movable gauge part having a code indicating end portion, a series of gauge parts stationarily operable for selective employment on said frame, at least one stationarily operable gauge part being removably mountable on said frame, a stationarily operable gauge part and said movable gauge part together comprising a graduated gauge for indicating code readings of the tumblers engaged by said finder point, a motion transmitting link yieldably, resiliently, and pivotally connected to the other longer end of said caliper bar at a distance from the pivotal mounting of said caliper bar on said frame which is a substantial multiple of the distance from said caliper bar pivotal mounting to said finder point, and pivotally connected to the end portion of said movable gauge part opposite said code indicating end portion, means pivotally mounting said movable gauge part on said frame at a distance from said code indicating end portion which is a substantial multiple of the distance from said pivotally mounting means to said link connected end portion so that the movement of said code indicating end portion with relation to said stationary gauge part is the product of the finder probe travel in measuring the tumblers to be decoded multiplied by said multiples and so that the assembly of said caliper bar, said link, and said movable gauge part are accessible outside of said frame for easy movement upon slight manual touch at any point thereof, and a spring detent carried by said frame in spaced relation from said assembly and engageable with one of said rack teeth at a time and releasable therefrom upon manual thrust upon said frame as motion of said spacer bar at the end adjacent the finder probe is opposed to selectively position the opposed end of the spacer bar with relation to said finder probe.

6. A method of decoding a tumbler type lock and constructing a key therefor, comprising the steps of, moving the lock tumblers to effect an unimpeded shear line to permit relative rotary movement between the lock cylinder and lock body, effecting such relative rotary motion to disrupt communication between the openings in lock cylinder and lock body which communicate in locked position, selecting from lock decoding calipers a caliper to operate in the lock cylinder slot and selecting from rack toothed spacer bars a bar with rack teeth spaced apart at intervals equal to the pitch between tumbler stations, mounting the selected caliper guide bar on a decoding frame, mounting the caliper bar with its shorter end portion to pivot on the frame and releasably connecting the other longer end of the caliper bar to the frame supported motion multiplier therefor and slidably inserting the selected spacer bar in the holder of the frame so that a spacer bar rack tooth is resiliently, yieldably engaged by the frame mounted detent, inserting the guide bar and caliper bar in the lock cylinder slot and moving the frame with relation to the spacer bar as the detent bears in the various station locating rack teeth and the spacer bar shoulders against the lock cylinder face, and employing the finder probe of the caliper bar to contact the tumblers at each station to measure the depths of key cut therefor and observing such measurements as multiplied by the code graduation traverse of the multiplier, and employing gauge means on said decoder as a key blank is worked to register tumbler station points thereon and to measure depths of key cuts at such stations until the key blank is worked to fit the lock.

7. Lock decoding apparatus as claimed in claim 3, which includes a gauge to mark off tumbler station distances from the shoulder of a key blank to be worked to construct a key to unlock the lock being decoded.

8. Lock decoding apparatus as claimed in claim 3, which includes a gauge to measure the depths of cuts to be made at tumblers stations marked off on a key blank to be worked to unlock the lock being decoded, such depths being indicated by said code graduated gauge.

9. Lock decoding apparatus as claimed in claim 3, which includes a gauge to mark off tumbler station distances from the shoulder of a key blank to be worked to construct a key to unlock the lock being decoded, and also includes a gauge to measure the depths of cuts to be made at said stations as indicated by said code graduated gauge.

10. In a link for pivotally connecting the motion multiplying end of a lock decoding frame supported caliper bar to a movable, motion multiplying gauge part pivotally mounted on said frame, the combination of, a link body with one end adapted for pivotal connection to said gauge part, the other end being reduced in width to form a prong with an arcuate recess in the reduced side thereof, an arm pivotally mounted on said link body and extending from said pivot in the direction of said prong and having an arcuate recess therein facing said prong recess and mating therewith to surround a pivot on said caliper bar, and hold down spring means connected at one end to said link body between said gauge part connection and said arm pivot and bearing at the other end against the outer side of said arm to urge said arm toward said prong to releasably encompass said caliper bar pivot in said recesses between said arm and said prong.

11. A motion multiplier and code indicating, movable gauge part for mounting on a lock decoder frame, and comprising, a motion multiplying movable gauge part pivotally mounted on said frame at one end portion and having code graduation indicating means at the other end thereof, a link including a link body pivotally connected at one end to said movable gauge part with the distance between the pivotal mounting of the movable gauge part and the code graduation indicating end thereof being a substantial multiple of the distance between said mounting and said link body connection, the other end of said body link being reduced in width to form a prong with an arcuate recess in the reduced side thereof, an arm pivotally mounted on said pivot to extend in the direction of said prong and having an arcuate recess therein facing said prong recess and mating therewith to surround a pivot on the multiplying end of a caliper bar supported by said frame, hold down spring means connected at one end to said link body and bearing at the other end against the outer side of said arm to urge said arm toward said prong to releasably encompass said caliper bar pivot in said recesses between said arm and said prong, and spring means connected at one end to said frame and at the other end to said link body to urge said link body toward its caliper bar connected end.

12. A lock decoding frame assembly comprising, a plate including an element supporting portion and a stationary gauge part portion, a slot on one side of said plate and spaced from said stationary gauge part to receive therein, a toothed rack spacer bar, resiliently yieldable detent means carried by said plate to bear upon said rack one tooth at a time to position said spacer bar, slot means provided on the opposite side of said plate from said slot to support in operation notched stationary caliper element means, a second spring detent mounted on said plate on the stationary gauge part side of said slot means to bear in a notch of said stationary caliper element means, means to provide a pivot on said plate to support a movable gauge part cooperative with said stationary gauge part to indicate a coded key blank depth of cut, said plate providing means to which an end of a spring may be connected, the other end of said spring being connectable to urge in the direction away from said stationary gauge part to rotate said movable gauge part.

13. A lock decoding frame assembly as claimed in claim 12 in which said slot means includes an upper slot to receive a caliper holder bar to which the caliper bar is pivoted and a lower slot parallel to said upper slot to receive the caliper guide bar.

14. A lock decoding frame assembly as claimed in claim 12 in which said stationary gauge part comprises a quadrant graduated in key depth cut code indications with a straight edge thereof extending along said plate, there being a stop on the outer corner of said quadrant.

15. A lock decoding frame assembly as claimed in claim 14 in which said plate has ears spaced apart to extend normal to the plane of said plate, and in which said quadrant provides spaced apart slots therein extending from, and normal to said straight edge to fit over said ears, additional means being also provided to connect said quadrant to said plate.

16. A method of decoding a tumbler type lock comprising the steps of, moving the lock tumblers to effect an unimpeded shear line to permit relative rotary movement between the lock cylinder and lock body, effecting such relative rotary motion to disrupt communication between the openings in lock cylinder and lock body which communicate in locked position, employing a lock decoding caliper to operate in the lock cylinder slot, employing a rack toothed spacer bar with rack teeth spaced apart at intervals equal to the pitch between tumbler stations, mounting the guide bar of the caliper on a decoding frame, mounting the caliper bar with its shorter end portion to pivot on the frame and connecting the other longer end of the caliper bar to the frame supported motion multiplier therefor and installing the spaced bar in the holder of the frame so that a spacer bar rack tooth is resiliently, yieldably engaged by the frame mounted detent, inserting the guide bar and caliper bar in the lock cylinder slot and moving the frame with relation to the spacer bar as the detent bears in the various station locating rack teeth and the spacer bar shoulders against the lock cylinder face, and employing the finder probe of the caliper bar to contact the tumblers at each station to measure the depths of key cut therefor and observing such measurements as multiplied by the code graduation traverse of the multiplier.

17. A lock decoding frame assembly comprising a plate including a bar supporting portion and an indicia marked stationary gauge part portion, a slot on one side of said plate and spaced from said stationary gauge part, a toothed rack spacer bar received in said slot with an end to bear against the lock cylinder face of a lock to be decoded, resiliently yieldable detent means carried by said plate to bear upon said rack one tooth at a time to position said spacer bar with relation to said plate, slot means provided on the opposite side of said plate from said slot, caliper cooperative means including a notched bar supported in said slot means and a guide prong insertable in the slot of said lock cylinder, a caliper bar pivotally connected to said caliper cooperative means and having a finder probe end to extend into said lock cylinder slot to probe measurement of the tumblers therein, a second resiliently yieldable means carried by said plate to bear upon said notched bar one notch at a time to position said notched bar with relation to said plate, a movable gauge part pivotally mounted on said plate to cooperate with said stationary gauge part in indicating coded key blank depths of cut in correspondence with probed tumbler measurements, and connection means pivotally connecting the end of said caliper bar opposite its probe end to said movable gauge part including yieldable means urging to rotate said movable gauge part to an initial position with relation to said stationary gauge part whereafter caliper bar probe movement is translated by movable gauge part rotation into coded key blank depths of cut indicated on said stationary gauge part.

18. A lock decording frame assembly as claimed in claim 17 in which said finder probe end extends in the plane of said guide prong.

19. A lock decoding frame assembly as claimed in claim 18 in which said finder probe end extends in operation sidewardly of said guide prong and on the same side thereof as the other end of said caliper bar.

20. A lock decoding frame assembly as claimed in claim 19 in which said finder probe end extends in operation sidewardly of said guide prong and on the opposite side thereof from the other end of said caliper bar.

21. A lock decoding frame assembly as claimed in claim 19 in which said notched bar of said caliper support assembly provides the element thereof to which said caliper bar is pivotally connected and in which said guide prong includes means in said slot means separately supporting it from said notched bar, and in which said guide prong extends in the plane of said finder probe end.

22. A lock decoding frame assembly as claimed in claim 17 in which the end of said caliper bar opposite its probe end includes a pin extending transversely therefrom and having a flange on the outer end thereof, and in which an end of said connection means is yieldably, releasably connectable about said pin between said flange and said caliper bar to effect pivotal connection between said connection means and said caliper bar.

23. A lock decoding frame assembly as claimed in claim 17 whereby said stationary gauge part includes a quadrant shaped portion, a separate correspondingly sized quadrant shaped part, containing said indicia thereon, and means removably mounting said quadrant shaped part on said quadrant shaped portion concentric therewith and containing said indicia thereon whereby quadrant shaped parts of equal size but containing variously spaced indicia thereon corresponding to codes of variously dimensioned lock cylinders may be selectively mounted on said stationary gauge part.

24. A method of decoding a tumbler type lock comprising the steps of moving the lock tumblers to effect an unimpeded shear line to permit relative rotary movement between the lock cylinder and the lock body, effecting such relative rotary motion as to disrupt communication between the openings in the lock cylinder and lock body which openings communicate when the lock is in locked position, selecting from lock decoding calipers a caliper to operate in the slot of the lock cylinder, selecting from rack toothed spacer bars a bar with rack teeth spaced apart at intervals equal to the pitch between tumbler stations, mounting the selected spacer bar on a decoding frame with end to bear against the face of the lock cylinder and to selectively space the frame therefrom by virtue of a spacer bar rack tooth being resiliently, yieldably engaged by a frame mounted detent, mounting the selected caliper on the frame with the guide prong thereof insertable in the lock cylinder slot and with the shorter probe end of the caliper bar to pivot on the caliper as the probe end is insertable in the lock cylinder slot while releasably, pivotally connecting the other end of the caliper bar to the motion multiplier supported by the frame, inserting the guide prong and probe end into the lock cylinder slot and moving the frame with relation to the spacer bar as the detent bears in the various station locating lack teeth end and the spacer bar end bears against the lock cylinder face, and employing the finder probe to contact the tumblers at each station to measure the depths of key cut therefor and observing such measurements as multiplied by the code graduation traverse of the multiplier.

References Cited in the file of this patent

UNITED STATES PATENTS

| | | |
|---|---|---|
| 1,687,649 | Gillett | Oct. 16, 1928 |
| 1,991,151 | Hausen | Feb. 12, 1935 |